(12) United States Patent
Jager et al.

(10) Patent No.: US 8,391,187 B2
(45) Date of Patent: Mar. 5, 2013

(54) METHOD AND COMMUNICATION TERMINAL DEVICE FOR EXCHANGING DATA DURING OR AFTER A COMMUNICATION CONNECTION

(75) Inventors: Hubert Jager, Pullach (DE); Arnold Monitzer, Pullach im Isartal (DE); Johann Zeiner, Karlsfeld (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 236 days.

(21) Appl. No.: 12/679,699

(22) PCT Filed: Sep. 10, 2008

(86) PCT No.: PCT/EP2008/061958
§ 371 (c)(1),
(2), (4) Date: Jun. 21, 2010

(87) PCT Pub. No.: WO2009/043697
PCT Pub. Date: Apr. 9, 2009

(65) Prior Publication Data
US 2010/0260073 A1 Oct. 14, 2010

(30) Foreign Application Priority Data
Sep. 28, 2007 (DE) .......................... 10 2007 046 978

(51) Int. Cl.
*H04L 12/16* (2006.01)
*H04M 3/42* (2006.01)
*G06F 15/16* (2006.01)

(52) U.S. Cl. ...................... 370/259; 379/93.27; 455/415; 709/219

(58) Field of Classification Search .......... 370/212–227, 370/259–352, 432–466; 379/93.26, 93.27, 379/386; 455/415–426; 709/219–224
See application file for complete search history.

(56) References Cited

U.S. PATENT DOCUMENTS

| | | | |
|---|---|---|---|
| 5,754,775 A | 5/1998 | Adamson et al. | |
| 6,012,088 A * | 1/2000 | Li et al. | 709/219 |
| 6,148,072 A | 11/2000 | Huang | |
| 6,298,128 B1 * | 10/2001 | Ramey et al. | 379/142.01 |
| 6,771,751 B1 * | 8/2004 | Kasturi et al. | 379/93.27 |
| 7,088,804 B1 * | 8/2006 | Kasturi et al. | 379/93.27 |
| 7,274,779 B2 * | 9/2007 | Casey | 379/93.18 |
| 7,519,164 B1 * | 4/2009 | Goldberg et al. | 379/88.11 |
| 7,734,027 B2 * | 6/2010 | Cai et al. | 379/142.06 |

(Continued)

OTHER PUBLICATIONS

Written Opinion of the International Searching Authority for PCT/EP2008/061958 dated May 27, 2010 (Forms PCT/IB/338 and PCT/ISA/237).

(Continued)

*Primary Examiner* — Man Phan
(74) *Attorney, Agent, or Firm* — Buchanan Ingersoll & Rooney PC

(57) ABSTRACT

The invention relates to a method for exchanging data between a first and a second communication terminal device (EG1, EG2). The first (EG1) and the second (EG2) communication terminal devices are connected to a data network (DN). In a first step, acoustically coded address information is transmitted by the first to the second communication terminal device (EG2) during a communication connection between the first and the second communication terminal device (EG1, EG2) and, in a second step, the data are transmitted to the first communication terminal device (EG1) from the second communication terminal device (EG2) via the data network using the address information.

20 Claims, 1 Drawing Sheet

U.S. PATENT DOCUMENTS

| | | | |
|---|---|---|---|
| 7,904,519 B2 * | 3/2011 | Czotscher et al. | 709/206 |
| 7,995,722 B2 * | 8/2011 | Vayssiere | 379/93.03 |
| 8,098,801 B2 * | 1/2012 | Kasturi et al. | 379/93.27 |
| 2005/0074008 A1 | 4/2005 | Herledan et al. | |
| 2006/0023852 A1 | 2/2006 | Casey | |
| 2007/0121830 A1 | 5/2007 | Kasturi et al. | |
| 2008/0159507 A1 * | 7/2008 | Virolainen et al. | 379/202.01 |
| 2009/0264114 A1 * | 10/2009 | Virolainen et al. | 455/416 |

OTHER PUBLICATIONS

International Preliminary Report on Patentability for PCT/EP2008/061958 dated Apr. 8, 2010 (Form PCT/IB/326 & PCT/IB/373).

International Search Report dated Dec. 9, 2008 for PCT/EP2008/061958 (Form PCT/ISA/210).

Written Opinion of the International Searching Authority for PCT/EP2008/061958 (Form PCT/ISA/237), (Dec. 9, 2008).

* cited by examiner

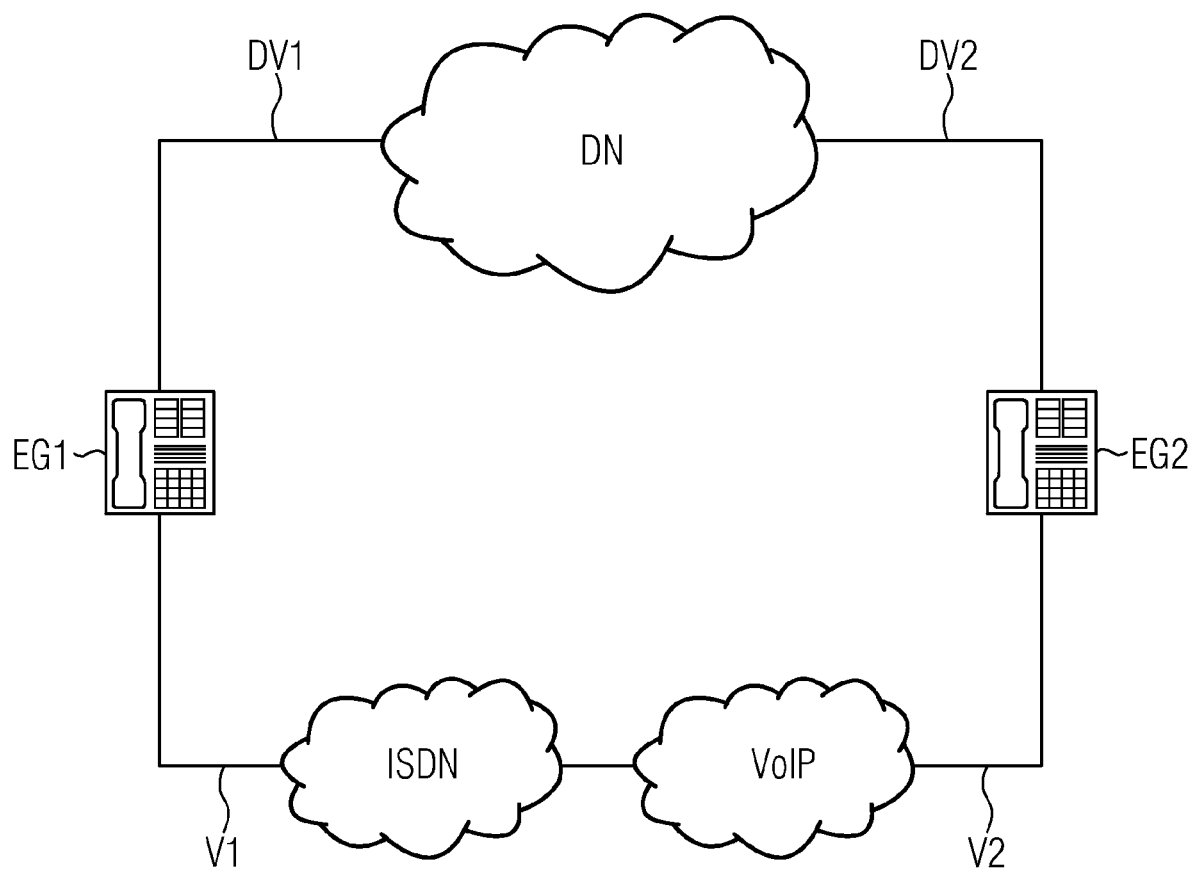

METHOD AND COMMUNICATION TERMINAL DEVICE FOR EXCHANGING DATA DURING OR AFTER A COMMUNICATION CONNECTION

CROSS-REFERENCE TO RELATED APPLICATIONS

This application is the United States national phase under 35 U.S.C. §371 of PCT International Application No. PCT/EP2008/061958 filed on Sep. 10, 2008, which claimed priority to German National Application No. 10 2007 046 978.2, filed on Sep. 28, 2007. Both of those applications are incorporated by reference herein.

BACKGROUND OF THE INVENTION

1. Field of the Invention

Embodiments of the invention provide methods for exchanging data between a first and a second communication terminal. Other embodiments provide communication terminals for executing a method for exchanging data.

2. Background of the Art

To initiate a telephone speech connection between two communication terminals, it is sufficient to have a telephone number for the communication terminal (telephone) to be called. Assuming the calling communication terminal is configured to transmit its own telephone number before or during the connection (CLIP function; CLIP=Calling Line Identification Presentation), and assuming that the called communication terminal is configured to receive and display this telephone number information, both participants in the conversation know the other communication terminal's telephone number during and after the communication connection.

However, it is often desirable to know the complete contact data for the other participant in the conversation: full name, mailing address, e-mail address, etc. Conversation participants generally provide these data to each other acoustically during a speech connection, but this "reading aloud" is not only time consuming, it is also prone to error. It requires that the conversation participants either write down the information given to them during the conversation or enter it in an address data bank, so that the information can be used again.

If both conversation participants are using a mobile telephone (GSM mobile telephone), many of these devices are able to store a contact data set as an electronic business card in the mobile telephone. Assuming that the telephone number of the conversation participant's mobile telephone is known, this "electronic business card" can then be transmitted to the conversation participant's mobile telephone as a text message after the end of the conversation, and there added to the mobile telephone's electronic address book. In addition to the disadvantage of this process requiring the use of appropriately equipped mobile telephones and networks, it has the further disadvantage that the contact data cannot be received until after the spoken conversation has ended, and then a number of manual inputs must be made on the mobile phone and at least one or—if data are sent in both directions—two billable text messages must be sent.

For speech data terminals (VoIP=Voice-over Internet Protocol), networks and protocols have been reported that support mostly automatic transmission of an electronic business card to the other conversation participant's terminal. It is assumed here that this involves a "clean" VoIP connection, which is not transmitted part of the way by another technology. It is further assumed that all of the communication nodes involved in the communication connection support the protocol for receiving and forwarding the address information (electronic business cards).

BRIEF SUMMARY OF THE INVENTION

It would be desirable to have a method and a communication terminal for exchanging data, especially contact data, wherein the data exchange takes place independently of the transmission technology used to carry the acoustic conversation information.

Embodiments provided herein provide methods for exchanging data between a first and a second communication terminal, wherein the first and second communication terminals are connected to a data network. In a first step, during a communication connection between the first and second communication terminals, a piece of coded acoustic address information is transmitted from the first to the second communication terminal; and in a second step, using the address information, the second communication terminal sends data through the data network to the first communication terminal.

Using this method, it is possible to exchange addresses over a standard telephone infrastructure that are intended for a data network, specifically for an IP network (IP=Internet Protocol). This allows any terminals that are communicating acoustically with each other (i.e., telephones using any technology on voice networks using any technology) to exchange data, and specifically address data, with each other during or after a conversation, as long as these terminals are connected to the data network, preferably the Internet. It is not necessary for the voice connection itself to be through the Internet, so the method can also be used in heterogeneous networks and across multiple technologies. Because the address information is simply sent acoustically over the voice channel ("in-band"), voice transmission is affected only briefly or not at all.

Embodiments of the invention also propose communications terminals for executing one of the methods described above, wherein said terminal is equipped for acoustic transmission of an address that is valid for a data network (address information) over an acoustic communication channel, and wherein the address is assigned to the communication terminal or to a data bank assigned to the communication terminal.

Such a communication terminal can therefore still exchange data, specifically address data, with other communication terminals even if the technology or the "connection" (bandwidth) used for the voice transmission is not capable of it. Because only the address information is exchanged over the acoustic voice channel, the operating conversation connection is affected only minimally or not at all. Interference is further minimized by the fact that the largest portion of the data transmission, containing the actual data to be transmitted, is sent over the data network and not the voice channel.

BRIEF DESCRIPTION OF THE FIGURE

FIG. 1 is a schematic representation of two communication terminals, connection to each other via a telephone network as well as a data network.

DETAILED DESCRIPTION OF THE INVENTION

A particularly important application case for communication terminals is when the data includes an electronic business card for the second communication terminal or for a user of the second communication terminal. Preferably, the most commonly used data network, i.e., the Internet, is used to send the data, specifically address data/business cards. It is still possible even if the terminal's Internet connection is narrowband and therefore not capable of operating a VoIP voice connection.

A commonly used technology is used if the address information in the first step is coded and sent as DTMF signals (DTMF=Dual Tone Multiple Frequency). This has the advantage that the DTMF signals can still be correctly transmitted even if a number of different partial transmission segments are used for the conversation connection, because DTMF signals are recorded in network nodes, involving a switch from analog to digital connections, and can be converted back into digital data/instructions. Any ordinary network infrastructure can therefore be used for DTMF signals. To minimize distortion/interference, the audible DTMF characters (DTMF signals) used by embodiments of the invention are transmitted very briefly and therefore several times in a row if necessary. When clean digital voice connections are used, such as an ISDN network, other transmission modes can be used instead of DTMF signals, such as the known User-to-User Information elements of the ISDN. Other acoustically based transmission modes may also be used, such as the coding (modulating) common to analog modems (fax modems, etc.).

In particular when the Internet is used as the data network, it is possible to use an e-mail address for the first communication terminal or a data bank assigned to the first communication terminal as the address information. If no individual e-mail address can be assigned to the communication terminal, the (personal) e-mail address of the communication terminal's user can be used instead.

As an alternative to e-mail addresses, the address information can consist of a globally valid Internet address (IP address/IP port number) for the first communication terminal or a data bank assigned to the first communication terminal. Preferably, a fixed IP port number is reserved for data transmission use. If the first communication terminal is operated "behind" a NAT router, generally no globally valid Internet address is assigned to that communication terminal. This applies specifically to communication terminals in large organizations or businesses. In this case one need only make a corresponding entry in the router's NAT table, so that the data can be sent to the router's globally valid IP address and then forwarded by the router to the locally operated communication terminal. It is also possible for large companies/organizations to have a central address data server that receives the data for the communication terminal, stores it, and keeps it available by means of a contact function in an e-mail program, for example.

The method is preferably operated bi-directionally, i.e. in such a way that the connected communication terminals can send data, specifically address information, both ways to each other, such that, in a third step, additional data can be sent by the first communication terminal over the data network to the second communication terminal. The necessary address information for the second communication terminal can either also be sent over the acoustic channel—using the aforementioned DTMF signals, for example—or can be taken from the data transmitted in the second step (e.g., electronic business cards). An electronic business card from the first communication terminal or from the user of the first communication terminal is advantageous.

For data protection purposes, it is important that a query be made before the second step to the first and/or second communication terminal, such that a user of the first and/or second communication terminal can approve the transmission of the data or address information and/or can initiate transmission of the data/address information.

Transmission of the principal audible DTMF signals or other acoustic signals is affected slightly or not at all if, in the first step, an acoustic signal that masks the transmission is sent to at least one of the communication terminals during transmission of the coded acoustic address information. This allows even the first communication terminal to initiate transmission of the masked signal to the second communication terminal using a previously agreed DTMF code or sequence of codes. Such a masked signal can be a sound or a musical signal, for example.

Depending on the configuration, the second step can take place during or after the end of the communication connection. The latter case applies to communication terminals that are not capable of exchanging data over the data network (e.g., Internet) during an active voice connection (telephone conversation). Preferably, a voice data terminal that is already connected to a data network (Internet) is used as the communication terminal. However, even mobile telephones can be used advantageously as the first and/or second communication terminals, wherein the data, specifically an electronic business card, are sent in a text message to the mobile telephone. In this case, the GSM mobile wireless network or a UMTS network is used as the data network.

It is preferable to be able to prevent undesired data, specifically address data sets, from being sent to the communication terminal and stored there. This can be accomplished by having a limited-validity access code be transmitted together with the acoustic coded address information in the first step, such that this access code is sent together with the data from the second communication terminal to the first communication terminal. This guarantees that only the conversation participant or communication terminal "authorized" during a voice connection can contact the first communication terminal's address list/data storage memory.

Examples of ways to execute embodiments of the described method are explained below with reference to the FIGURE. They simultaneously include explanations of a communication terminal according to embodiments of the invention.

In the FIGURE, telephones EG1 and EG2 represent communication terminals, with telephone EG1 represented by the example of a land-line desk phone. For communication, telephone EG1 uses an ISDN connection, for which it is connected through connection V1 to a public communication network ISDN. For exchanging address data (electronic phone book, electronic business cards, etc.), telephone EG1 has a data connection, which in this case consists of a WLAN interface through which telephone EG1 is connected to the data network (here, the Internet) by a data connection DV1. In this execution example, Telephone EG2 is a so-called IP phone, i.e., a Voice-over IP terminal for voice data communication. Through a data interface (not shown), telephone EG2 operates two connections: a connection V2 for conducting the telephone conversation (communication connections) and a connection DV2 for exchanging address information, electronic business cards, etc. over the data network DN (here, the Internet). The data connections V2 and DV2 are therefore logical connections (channels) that exchange data over the same transport medium (e.g., WLAN or Ethernet).

The ISDN and VoIP networks shown here are examples of an optional combination of different "carrier methods" for a voice communication connection (telephone conversation). In reality, they may be arranged in specific sequences of analog segments or partial segments, satellite connections, etc. The data connections DV1 and DV2 and the carrier methods used for them do not have to have bandwidths large enough to accommodate a VoIP telephone conversation on a synchronous connection; even narrow-band transmission can be used here, as long as it is adequate for asynchronous transmission of address information or other exchanged data.

The following outlines an example of a communication connection between telephones EG1 and EG2. A first user on telephone EG1 calls a second user on telephone EG2. The conversation participants agree to provide their complete contact information to each other, in the form of electronic business cards. The user on telephone EG1 starts this process by entering a corresponding signal: here, pressing an appropriately designated "soft key." Telephone EG1 then sends a short DTMF sequence, in this case "9#," over the operating voice connection, i.e., through connection V1, the ISDN network, the VoIP network, and connection V2, to telephone EG2. This results in both telephones EG1 and EG2 playing a melody over their speakers or in the earpieces of their receivers for a fixed amount of time (here: 3 seconds), which is used to mask the transmission of additional DTMF signals. During this time, telephone EG1 transmits an e-mail address assigned to telephone EG1, in acoustic coded form, i.e. as DTMF signals, to telephone EG2. Because DTMF coding can only differentiate between 16 conditions, each alphanumeric character of the e-mail address is transmitted by means of two DTMF characters in sequence. Optionally, a different type of coding may be used. Specifically in cases where an IP address or IP port number is used instead of an e-mail address, only numeric characters need to be transmitted, so each DTMF character can transmit one number of the internet address. An exchange of pilot character sequences ("handshake") may also take place, so that the coding for the following characters to be sent is agreed upon between telephones EG1 and EG2. The time taken to transmit the individual DTMF characters and the length of the masking "wait music" in this example are determined such that transmission of the address information (e-mail address, etc.) is acoustically masked and the voice connection is interrupted or impaired as briefly as possible. The address exchange over an acoustic channel described above is also known as "virtual handshaking."

Based on the e-mail address received, telephone EG2 now sends an e-mail message with "its" electronic business card (or the address information of the user of telephone EG2) through data connection DV2, the data network DN (Internet), and data connection DV1 to telephone EG1, where this e-mail message is automatically opened and its content (the electronic business card) is placed into the address list of telephone EG1 or is otherwise processed. Based on the address information contained therein (including the e-mail address for telephone EG2), telephone EG1 now sends the same type of data from its side (here: electronic business card for the user of telephone EG1) to telephone EG2. Alternatively, the e-mail address for telephone EG2 can be sent in analog form to the e-mail address of telephone EG1 over the voice connection by means of DTMF coding or another type of in-band transmission.

As an option, telephones EG1 and EG2 can send special access codes to each other, along with the acoustic coded address information, that are valid only once and/or only for a limited length of time, e.g., 20 seconds. Telephones EG1 and EG2 insert these access codes received from the other telephones EG1 and EG2 into the e-mail message with the address information/electronic business card to be sent, preferably in the subject line. This can ensure that only e-mail messages with address information that came from or were requested in a corresponding "authorized" voice connection are automatically accepted.

In alternative embodiments, the address banks (electronic telephone book, address list, etc.) are not integrated into telephones EG1 and EG2 themselves, but rather are provided as central data bank applications, such as an intranet. In this case, the e-mail addresses are not sent as acoustic coded address information to telephones EG1 and EG2, but rather to corresponding access points ("ports") in these central applications. In this case, the limited-validity "access code" sent with the data can be used to identify the specific terminal or user for whom the transmitted data are intended, for example. As a further "safety feature," query messages can also be sent out to telephones EG1 and EG2 and used to allow or prevent transmission and/or receipt of the data.

Because it is possible, as shown here, to exchange data (electronic business cards, etc.) during the voice connection, in the specific case where an Internet connection is not always available to participating telephones EG1 and EG2, a corresponding data exchange can still take place after the voice connection is terminated. In particular when mobile telephones are used, which in some cases have no Internet connection (when roaming in foreign networks, for example), a telephone number can also be used as the acoustic coded address information, linked to a request for the corresponding data (e.g., electronic business card) to be sent as a text message to that telephone number. Combined forms of the above can obviously also be used, so that an e-mail message can be used in one direction while a text message, for example, is used in the other direction. Finally, instead of DTMF characters, another type of acoustic coding can be used, such as the modulation used for data modems and fax modems. The defining feature of the invented method is that a short sequence, i.e., a piece of address information, can be sent "in-band" over the voice channel to any other communication terminal.

Other desired data can be sent over the data connection(s) DV1, DV2, and DN instead of an electronic business card, such as a picture of the conversation participant, text files, electronic documents, etc.

The invention claimed is:

1. A method for exchanging data between a first communication terminal and a second communication terminal, wherein the first communication terminal and the second communication terminal are connected to a data network, comprising:
    establishing a voice communication connection between the first communication terminal and the second communication terminal via a voice communication network to which the first communication terminal and the second communication terminal are connected, the voice communication network being a network that is at least logically different than the data network;
    transmitting acoustic coded address information from the first communication terminal to the second communication terminal via the voice communication connection; and
    sending data over the data network from the second communication terminal to the first communication terminal using the acoustic coded address information; and
    wherein the sent data comprises at least one of an electronic business card for the second communication terminal and an electronic business card for a user of the second communication terminal.

2. The method of claim 1, comprising sending additional data by the first communication terminal over the data network to the second communication terminal following the step of sending data over the data network from the second communication terminal to the first communication terminal, the additional data comprising at least one of an electronic business card for the first communication terminal and an electronic business card for a user of the first communication terminal.

3. A method for exchanging data between a first communication terminal and a second communication terminal, wherein the first communication terminal and the second communication terminal are connected to a data network, comprising:
  during a communication connection between the first communication terminal and the second communication terminal, transmitting acoustic coded address information from the first communication terminal to the second communication terminal;
  sending data over the data network from the second communication terminal to the first communication terminal using the acoustic coded address information;
  sending additional data by the first communication terminal over the data network to the second communication terminal following the step of sending data over the data network from the second communication terminal to the first communication terminal; and
  prior to the step of sending additional data, sending a query to at least one of the first communication terminal and the second communication terminal, and wherein the sending of the data is approved, initiated, or approved and initiated by a user of at least one of the first communication terminal and the second communication terminal.

4. The method of claim 3 wherein the data is selected from the group consisting of an electronic business card for the second communication terminal and an electronic business card for a user of the second communication terminal.

5. The method of claim 3 wherein the data network is the Internet.

6. The method of claim 3 wherein the acoustic coded address information is coded and transmitted as DTMF signals.

7. The method of claim 3 wherein the acoustic coded address information is selected from the group consisting of an e-mail address for the first communication terminal and an e-mail address for a data bank assigned to the first communication terminal.

8. The method of claim 3 wherein the acoustic coded address information is selected from the group consisting of a globally valid Internet address for the first communication terminal and a globally valid Internet address for a data bank assigned to the first communication terminal.

9. The method of claim 3 wherein the additional data is selected from the group consisting of an electronic business card for the first communication terminal and an electronic business card for a user of the first communication terminal.

10. The method of claim 3 comprising during transmission of the acoustic coded address information, sending an acoustic signal masking the transmission to at least one of the communication terminals.

11. The method of claim 3 wherein the step of sending data over the data network takes place during the communication connection.

12. The method of claim 3 wherein the step of sending data over the data network takes place after the communication connection is terminated.

13. The method of claim 3 wherein at least one of the first communication terminal and the second communication terminal is a voice data terminal and wherein the communication connection is a voice communication connection formed via a carrier method communication network.

14. The method of claim 3 wherein at least one of the first communication terminal and the second communication terminal is a mobile telephone, and the data is transmitted to the mobile telephone in a text message.

15. The method of claim 3 comprising, during transmission of the acoustic coded address information, transmitting a limited-validity access code with the acoustic coded address information from the second communication terminal together with the data to the first communication terminal.

16. A communication terminal for voice communication or multimedia communication comprising a communication terminal equipped for acoustic transmission of an address valid for a data network using an acoustic communication channel of a voice communication network wherein the address is assigned to a member of the group consisting of the communication terminal and a data bank assigned to the communication terminal, wherein the communication terminal:
  establishing a voice communication connection between the communication terminal and another communication terminal via the voice communication network to which the first communication terminal and the other communication terminal are connected, the voice communication network being a network that is at least logically different than the data network;
  receiving acoustic coded address information from the other communication terminal via the voice communication connection formed over the voice communication network;
  sending data to the other communication terminal via a data network to which the communication terminal is connected, the sent data being sent based upon the acoustic coded address information sent to the communication terminal, the data network being a network that is logically different from the voice communication network; and
  wherein the sent data comprises information from at least one of an electronic business card for the communication terminal and an electronic business card for a user of the communication terminal.

17. The communication terminal of claim 16 wherein the acoustic coded address information is coded and transmitted as DTMF signals.

18. The communication terminal of claim 16 wherein the acoustic coded address information is selected from the group consisting of an e-mail address for the other communication terminal and an e-mail address for a data bank assigned to the other communication terminal.

19. The communication terminal of claim 16 wherein the acoustic coded address information is selected from the group consisting of a globally valid Internet address for the other communication terminal and a globally valid Internet address for a data bank assigned to the other communication terminal.

20. A communication system comprising:
  a data network;
  a voice communication network that is logically different than the data network;
  a first communication terminal connected to the data network and the voice communication network; and
  a second communication terminal connected to the data network and the voice communication network; and
  the first communication terminal establishing a voice communication connection with the second communication terminal via the voice communication network; and the first communication terminal transmitting acoustic coded address information to the second communication terminal via the voice communication connection; and the second communication terminal sending data over the data network to the first communication terminal using the acoustic coded address information; and wherein the sent data comprises information from at least one of an electronic business card for the second communication terminal and an electronic business card for a user of the second communication terminal.

* * * * *